US010616059B2

(12) United States Patent
Ali et al.

(10) Patent No.: US 10,616,059 B2
(45) Date of Patent: Apr. 7, 2020

(54) AGENTLESS METHOD TO BRING SOLUTION AND CLUSTER AWARENESS INTO INFRASTRUCTURE AND SUPPORT MANAGEMENT PORTALS

(71) Applicant: DELL PRODUCTS L.P., Hopkinton, MA (US)

(72) Inventors: Rizwan Ali, Cedar Park, TX (US); Ravikanth Chaganti, Bangalore (IN); Dharmesh M. Patel, Round Rock, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/938,373

(22) Filed: Mar. 28, 2018

(65) Prior Publication Data

US 2019/0306013 A1    Oct. 3, 2019

(51) Int. Cl.
| | |
|---|---|
| *H04L 12/24* | (2006.01) |
| *G06F 9/50* | (2006.01) |
| *H04L 12/911* | (2013.01) |
| *H04L 29/08* | (2006.01) |
| *H04L 12/18* | (2006.01) |
| *G06F 16/27* | (2019.01) |

(52) U.S. Cl.
CPC ......... *H04L 41/082* (2013.01); *G06F 9/5072* (2013.01); *G06F 9/5077* (2013.01); *G06F 9/5083* (2013.01); *G06F 16/27* (2019.01); *H04L 12/185* (2013.01); *H04L 41/085* (2013.01); *H04L 41/0893* (2013.01); *H04L 47/82* (2013.01); *H04L 67/10* (2013.01)

(58) Field of Classification Search
CPC .............................. H04L 12/185; G06F 16/27
See application file for complete search history.

(56) References Cited

U.S. PATENT DOCUMENTS

| | | | |
|---|---|---|---|
| 5,483,637 | A  | 1/1996  | Winokur et al. |
| 6,317,028 | B1 | 11/2001 | Valiulis |
| 7,103,874 | B2 | 9/2006  | McCollum et al. |
| 7,222,127 | B1 | 5/2007  | Bem et al. |
| 7,500,142 | B1 | 3/2009  | Cowart et al. |
| 7,516,362 | B2 | 4/2009  | Connelly et al. |
| 7,831,693 | B2 | 11/2010 | Lai |

(Continued)

OTHER PUBLICATIONS

Extended European Search Report issued in corresponding European Application No. 18200661.9 dated Apr. 1, 2019. (9 pages).

(Continued)

*Primary Examiner* — Lashonda T Jacobs
(74) *Attorney, Agent, or Firm* — Chamberlain, Hrdlicka, White, Williams & Aughtry

(57) ABSTRACT

A coordination point includes a persistent storage and a processor. The persistent storage stores a distributed system map. The processor obtains role information associated with computing devices from validators without interacting with user resources of the computing devices; updates the distributed system map using the obtained role information; identifies a portion of the computing devices as members of a functionality group using the updated distributed system map; and enforces a configuration, associated with the functionality group, on the user resources of each computing device of the portion of the computing devices.

20 Claims, 15 Drawing Sheets

(56) References Cited

U.S. PATENT DOCUMENTS

| | | | |
|---|---|---|---|
| 7,886,031 B1 | 2/2011 | Taylor et al. | |
| 7,987,353 B2 | 7/2011 | Holdaway et al. | |
| 8,166,552 B2 | 4/2012 | Prafullchandra et al. | |
| 8,386,930 B2 | 2/2013 | Dillenberger et al. | |
| 8,401,982 B1 | 3/2013 | Satish et al. | |
| 8,583,769 B1 | 11/2013 | Peters et al. | |
| 8,639,798 B2 | 1/2014 | Akiyama et al. | |
| 8,826,077 B2 | 9/2014 | Bobak et al. | |
| 8,868,987 B2 | 10/2014 | Wagner | |
| 8,874,892 B1 | 10/2014 | Chan et al. | |
| 8,995,439 B2* | 3/2015 | Field | H04L 12/185 370/390 |
| 9,122,501 B1 | 9/2015 | Hsu et al. | |
| 9,122,739 B1 | 9/2015 | Yadwadkar et al. | |
| 9,201,751 B1 | 12/2015 | Muthirisavenugopal et al. | |
| 9,278,481 B2 | 3/2016 | Hull | |
| 9,355,036 B2 | 5/2016 | Beard et al. | |
| 9,384,082 B1 | 7/2016 | Lee et al. | |
| 9,542,177 B1 | 1/2017 | Johansson et al. | |
| 9,864,634 B2 | 1/2018 | Kenkre et al. | |
| 9,898,224 B1 | 2/2018 | Marshak et al. | |
| 10,057,184 B1 | 8/2018 | Prahlad et al. | |
| 10,097,620 B2 | 10/2018 | Reddy et al. | |
| 10,514,907 B2* | 12/2019 | Chaganti | G06F 8/61 |
| 2003/0149919 A1 | 8/2003 | Greenwald et al. | |
| 2004/0088145 A1 | 5/2004 | Rosenthal | |
| 2004/0177168 A1 | 9/2004 | Alabraba et al. | |
| 2004/0225381 A1 | 11/2004 | Ritz et al. | |
| 2006/0149408 A1 | 7/2006 | Speeter et al. | |
| 2006/0178864 A1 | 8/2006 | Khanijo | |
| 2006/0179116 A1 | 8/2006 | Speeter et al. | |
| 2006/0235962 A1 | 10/2006 | Vinberg et al. | |
| 2007/0143851 A1 | 6/2007 | Nicodemus et al. | |
| 2007/0202469 A1 | 8/2007 | Davidson | |
| 2008/0201470 A1 | 8/2008 | Sayama | |
| 2008/0228755 A1 | 9/2008 | Haga et al. | |
| 2009/0012805 A1 | 1/2009 | Schnell et al. | |
| 2009/0165099 A1 | 6/2009 | Eldar et al. | |
| 2009/0183010 A1 | 7/2009 | Schnell et al. | |
| 2009/0260071 A1 | 10/2009 | Sadovsky et al. | |
| 2009/0282283 A1 | 11/2009 | Sakakura et al. | |
| 2010/0024001 A1 | 1/2010 | Campbell | |
| 2010/0229022 A1 | 9/2010 | Anand et al. | |
| 2010/0325493 A1 | 12/2010 | Morimura et al. | |
| 2011/0078428 A1 | 3/2011 | Hamid | |
| 2011/0093703 A1* | 4/2011 | Etchegoyen | G06F 21/57 713/168 |
| 2011/0289342 A1 | 11/2011 | Schaefer et al. | |
| 2011/0289343 A1 | 11/2011 | Schaefer et al. | |
| 2011/0302305 A1 | 12/2011 | Morimura et al. | |
| 2012/0041976 A1* | 2/2012 | Annapragada | G06F 16/2471 707/770 |
| 2012/0110142 A1 | 5/2012 | Montagna et al. | |
| 2012/0150926 A1* | 6/2012 | Adkins | G06F 16/18 707/825 |
| 2012/0182151 A1 | 7/2012 | Tong | |
| 2012/0233216 A1 | 9/2012 | Lim | |
| 2012/0271927 A1 | 10/2012 | Shakirzyanov et al. | |
| 2012/0331526 A1 | 12/2012 | Caudle et al. | |
| 2013/0151975 A1 | 6/2013 | Shadi et al. | |
| 2013/0326029 A1 | 12/2013 | Flynn | |
| 2014/0069291 A1 | 3/2014 | Yang | |
| 2014/0115176 A1 | 4/2014 | Kamboh et al. | |
| 2014/0281675 A1* | 9/2014 | Sreenivasan | H04L 69/40 714/4.11 |
| 2014/0304399 A1 | 10/2014 | Chaudhary et al. | |
| 2014/0304402 A1 | 10/2014 | Prakash et al. | |
| 2015/0117174 A1 | 4/2015 | Alber et al. | |
| 2015/0149822 A1 | 5/2015 | Coronado et al. | |
| 2015/0256394 A1 | 9/2015 | Palmer | |
| 2016/0042288 A1 | 2/2016 | Cohen et al. | |
| 2016/0048611 A1 | 2/2016 | Cox | |
| 2016/0057009 A1* | 2/2016 | Kadayam | G06F 11/2069 709/221 |
| 2016/0110240 A1 | 4/2016 | Reger et al. | |
| 2016/0112504 A1 | 4/2016 | Mathur et al. | |
| 2016/0302323 A1 | 10/2016 | Gosselin | |
| 2017/0094003 A1* | 3/2017 | Gahlot | H04L 47/746 |
| 2017/0339005 A1* | 11/2017 | Yuan | H04L 43/00 |
| 2018/0025166 A1* | 1/2018 | Daniel | G06Q 10/06 713/189 |
| 2018/0034709 A1 | 2/2018 | Chen et al. | |
| 2018/0285009 A1 | 10/2018 | Guim Bernat et al. | |
| 2018/0329579 A1* | 11/2018 | Kaimal | G06F 9/451 |
| 2019/0123985 A1 | 4/2019 | Rao et al. | |
| 2019/0303137 A1* | 10/2019 | Chaganti | G06F 8/61 |
| 2019/0306013 A1* | 10/2019 | Ali | H04L 41/0893 |
| 2019/0324841 A1 | 10/2019 | Patel et al. | |

OTHER PUBLICATIONS

Extended European Search Report issued in corresponding European Application No. 19151952.9, dated Jul. 1, 2019.

Duncan Tweed; "BMC Atrium Discovery User Guide"; BMC Software, Inc.; Mar. 2014; retrieved from https://bmc.com/.

Duncan Tweed; "Baseline configuration"; BMC Software, Inc.; Apr. 7, 2015; retrieved from https://bmc.com/.

Masoom Parvez; "AutomaticGroup Node"; BMC Software, Inc.; 2014; retrieved from https://bmc.com/.

"Integrated Dell Remote Access Controller 8 (iDRAC8)", Version 2.05.05.05 User's Guide, Dell Inc., Dec. 2014 (348 pages).

Iler, Doug, et al., "Introducing iDRAC8 with Lifecycle Controller for Dell 13th Generation PowerEdge Servers", A Dell Deployment and Configuration Guide, Dell Inc., Sep. 2014 (16 pages).

"Dell DRAC—Wikipedia"; XP055602141; Mar. 23, 2018; https://en.wikipedia.org/w/index.php?title=Dell_DRAC&oldid=831957421.

"Dell EMC OpenManage Essentials Version 2.3: User's Guide"; XP055602720; Oct. 1, 2017; https://topics-cdn.dell.com/pdf/openmanage-essentials-v23 users-guide en-us.pdf.

Zhengyu Liang et al.; "ClusterProbe: An Open, Flexible and Scalable Cluster Monitoring Tool"; IEEE Computer Society International Workshop on Cluster Computing; pp. 261-268; 1999.

\* cited by examiner

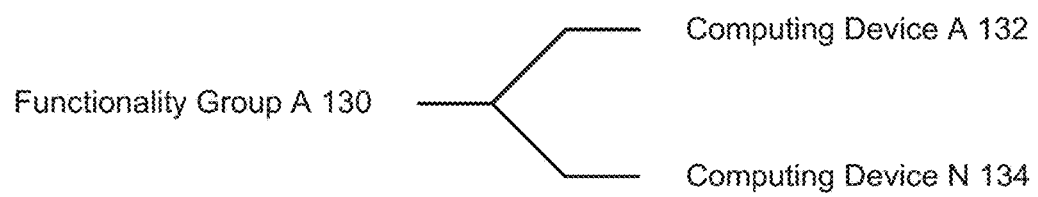
FIG. 1B
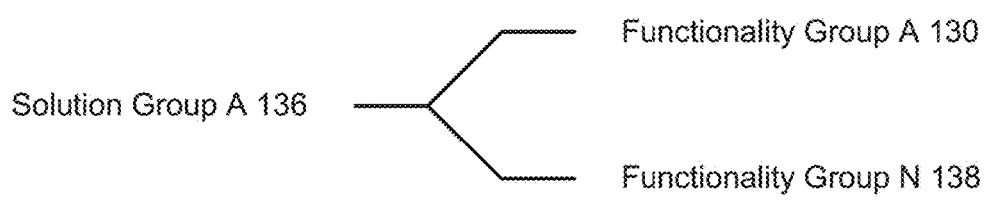
FIG. 1C
Example Functionality Group 140
| Computing Device A 142 | Computing Device B 144 | Computing Device C 146 |
FIG. 1D

| Role Information | Baseline Configuration |
| --- | --- |
| Computation Manager | Minimum Connectivity |
| Computation Node | Maximum Connectivity |

FIG. 7B

AGENTLESS METHOD TO BRING SOLUTION AND CLUSTER AWARENESS INTO INFRASTRUCTURE AND SUPPORT MANAGEMENT PORTALS

BACKGROUND

Computing devices may include any number of internal components such as processors, memory, and persistent storage. Each of the internal components may operate with other components of the computing devices. For example, some processors store generated data in a persistent storage and may utilize capacity of the memory to perform computations.

In a network environment, multiple computing devices may cooperate to accomplish a task. For example, multiple computing devices may perform different computations that may be used, in turn, to generate a final result.

SUMMARY

In one aspect, a coordination point in accordance with one or more embodiments of the invention includes a persistent storage and a processor. The persistent storage stores a distributed system map. The processor obtains role information associated with computing devices from validators without interacting with user resources of the computing devices; updates the distributed system map using the obtained role information; identifies a portion of the computing devices as members of a functionality group using the updated distributed system map; and enforces a configuration, associated with the functionality group, on the user resources of each computing device of the portion of the computing devices.

In one aspect, a method for configuring user resources of computing devices includes obtaining role information associated with the computing devices from validators without interacting with user resources of the computing devices; updating a distributed system map using the obtained role information; identifying a portion of the computing devices as members of a functionality group using the updated distributed system map; and enforcing a configuration, associated with the functionality group, on the user resources of each computing device of the portion of the computing devices.

In one aspect, a non-transitory computer readable medium in accordance with one or more embodiments of the invention includes computer readable program code, which when executed by a computer processor enables the computer processor to perform a method for configuring user resources of a plurality of computing devices. The method includes obtaining role information associated with the computing devices from validators without interacting with user resources of the computing devices; updating a distributed system map using the obtained role information; identifying a portion of the computing devices as members of a functionality group using the updated distributed system map; and enforcing a configuration, associated with the functionality group, on the user resources of each computing device of the portion of the computing devices.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1B shows a diagram of a first relationship in accordance with one or more embodiments of the invention.

FIG. 1C shows a diagram of a second relationship in accordance with one or more embodiments of the invention.

FIG. 1D shows a diagram of an example functionality group in accordance with one or more embodiments of the invention.

FIG. 7B shows a diagram of role information and associated baseline configurations of the example system of FIG. 7A.

DETAILED DESCRIPTION

Figure 1A:
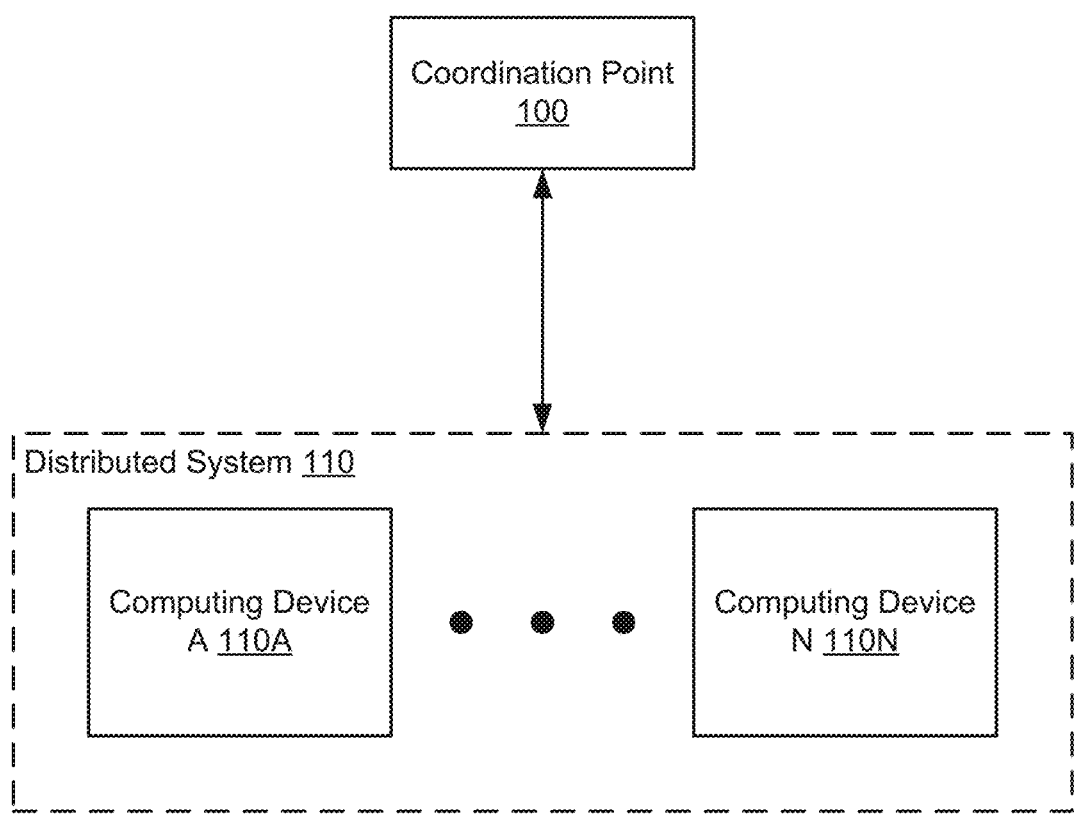
FIG. 1A shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for securing computing devices in a distributed system. More specifically, a distributed system may include any number of computing devices that are orchestrated to accomplish a goal. To organize the computing devices of the distributed system, embodiments of the invention may identify a role of each computing devices of the distributed system and enforce a configuration on the computing device that corresponds to the identified role of the computing device.

In one or more embodiments of the invention, user resources of the computing device do not include software agents that identify a role of the computing device or enforce configurations on the user resources. Eliminating such software agents may reduce the exposure of the user resources to third parties by reducing the number of processes or hardware functions being performed by the user resources. Reducing exposure of the user resources may reduce the likelihood of a third party comprising the user resources and, consequently, improve the security of the computing devices.

In one or more embodiments of the invention, each, or a portion, of the computing devices of the distributed system host validators. A validator may be hardware device. The validator may be separate from user resources of a host computing device. In one or more embodiments of the invention, the validator is an embedded hardware device. The embedded hardware device hosted by a computing device. The validator may store information that specifies a role of the computing device hosting the validator. The validator may provide the role information to a coordination point, or other entity, as part of a configuration processes/deployment of the computing devices of the distributed system. Thus, by providing the role via the validators, the roles of the computing devices may be determined without interacting with the user resources of the computing devices. Doing so may enable a computing device in accordance with embodiments of the invention to be hardened against malicious attacks by third parties.

In one or more embodiments of the invention, the validator may enforce a configuration on the user resources. The configurations may be associated with roles of the computing devices. By enforcing a configuring on each of the computing devices associated with their respective roles, embodiments of the invention may reduce the likelihood of compatibility issues between the computing devices, may improve the efficiency of computations performed by the distributed system, and may otherwise improve the operation of the distributed system.

In one or more embodiments of the invention, identification of the roles of the computing devices of the distributed system may facilitate management of the computing devices. For example, a management console or other administrative tool may automatically flag or identify computing devices that are part of a distributed system. By identifying the members, e.g., the computing devices, of the distributed system, group level management policies may be used to manage all of the members of the distributed system. Doing so may reduce the cognitive burden on system administrator or other personnel tasked with maintaining/managing distributed systems.

Further, in a scenario in which multiple distributed system are included in, for example, a single computing cluster, identification of members of the distributed system may substantially reduce the cognitive burden placed on system administrators. Automatic identification and display of such distributed system may enable system administrator to quickly and efficiently manage such systems.

In one or more embodiments of the invention, identification of the roles of the computing devices of the distributed system may facilitate the efficient identification of distributed system level problems. For example, when a user of a computing device of a distributed system reports a problem, a heavy cognitive burden is placed on a system administrator to identify that the particular system used by the user is a member of a distributed system. Embodiments of the invention may reduce or eliminate that cognitive burden by automatically identifying members of the distributed system and, further, may identify the computing devices with a functionality group of the distributed system. Doing so may enable a system administrator to rapidly and easily identify the computing device as being a member of a distributed system and, consequently, more easily identify problems attributable to the distributed system rather than the computing device in isolation.

FIG. 1A shows a system in accordance with one or more embodiments of the invention. The system may include a distributed system (110) and a coordination point (100). The coordination point (100) may identify a role of each computing device and configure each computing based on the identified role of each computing device. Different computing devices may have different roles.

In one or more embodiments of the invention, the coordination point (100) may initiate functions of validators (not shown) of computing devices (110A, 110N) of the distributed system (110) to enforce configurations on the computing device (110A, 110N). By initiating the functions of the validators, the computing devices (110A, 110N) may be placed into a state where groups of the computing devices operate cooperatively to provide group level functionality. In other words, groups of computing devices may be organized into functionality groups that perform different or similar functions. For additional details regarding functionality groups, See FIGS. 1B and 1D.

In one or more embodiments of the invention, multiple functionality groups may be organized into a solution architecture. A solution architecture may provide a predetermined functionality using the functionality of one or more of the multiple functionality groups. In other words, multiple functionality groups may be grouped into a solution group that performs a predetermined task, accomplishes an objective, provides a predetermined functionality, etc. For additional details regarding solution groups, See FIG. 1C.

In one or more embodiments of the invention, the coordination point (100) and distributed system (110) are operably connected. The operable connection may be implemented using any combination of wired and/or wireless networks. Each components of the system is discussed below.

In one or more embodiments of the invention, the coordination point (100) identifies a role of each computing device, e.g., membership in a functionality group, of the distributed system (110). After a role of a computing device is identified, the coordination point may initiate functions of the computing device to enforce a configuration on the computing devices.

In one or more embodiments of the invention, a role of a computing device is determined by the coordination point (100) without communicating with a software agent executing using user resources of the computing device. The role of the computing device may be determined by obtaining information from a validation hosted by the computing device. The validator may be a hardware device. The validator may store information regarding a role of the computing device. For additional details regarding a validator, See FIG. 3.

In one or more embodiments of the invention, the configuration specifies any combination of hardware, firmware, firmware settings, and/or applications of user resources of a computing device. The configuration may be enforced on all, or a portion, of the computing devices that are members of a functionality group. By enforcing a common configuration across computing devices of a functionality group, embodiments of the invention may reduce the likelihood of compatibility problems among the computing devices of the functionality group. As will be discussed in further detail below, compatibility problems may cause the computing devices to be less efficient, e.g., consume more computing resources, to perform the functionality associated with the functionality group.

In one or more embodiments of the invention, the coordination point (100) is implemented as a computing device. The computing device may be, for example, a mobile phone, a tablet computer, a laptop computer, a desktop computer, a server, or a cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the coordination point (100) described in this application and/or perform the method illustrated in FIGS. 5A-5C. For additional details regarding a computing device, See FIG. 8.

In one or more embodiments of the invention, the distributed system (110) orchestrates the operation of computing devices (110A, 110N) to accomplish a goal, provide a predetermined function, or otherwise cooperatively interact with each other. The goals may be, for example, to store data, to provide stored data, or to perform computations on stored data. The distributed system (110) may be, for example, a computer cluster. While the distributed system (110) is illustrated as only include computing devices (110A, 110N), the distributed system (110) may include other components such as switches, routers, network attached storage, or other devices without departing from the invention. The other components (not shown) may provide operable connections between computing devices of the distributed system (110).

In one or more embodiments of the invention, the distributed system (110) orchestrates the operation of the computing devices (110A, 110N) by configuring all or a portion of the computing devices (110A, 110N). Configuring the computing devices (110A, 110N) may reduce the likelihood of compatibility issues between computing devices that must interact to cooperatively operate to accomplish a goal. As will be discussed with respect to FIGS. 2 and 3, the computing devices may be configured by having a configuration enforced on the user resources of the computing devices by validators hosted by the computing devices.

The computing devices (110A, 110N) may be configured by, for example, loading computing instructions on persistent storage of the respective computing devices (110A, 110N) that are executed by processors of the respective computing devices. In other words, applications executing on the computing devices may be loaded, deleted, or modified as part of a configuration.

The computing devices (110A, 110N) may be configured by other methods such as, for example, disabling/enabling hardware components, changing configuration settings, and/or loading different versions of firmware than that already present on the computing devices without departing from the invention. Each of the computing devices (110A, 110N) may be configured to perform similar or different functions without departing from the invention.

In one or more embodiments of the invention, groups of computing devices of respective functionality groups of a solution group are configured to cooperatively perform various functions. For example, to configure a group of computing devices of a functionality group of the distributed system (110) to provide data storage services the system may configure: (i) a first group of computing devices to segment to-be-stored data, (ii) a second group of computing devices to compute fingerprints of the segments of the to-be-stored data, (iii) a third group of computing devices to determine whether the fingerprints of the segments of the data match fingerprints of already stored segments, and (iv) a fourth group of computing devices to store the segments of the data having associated fingerprints that do not match finger prints of already stored segments of data. Thus, any number of computing devices (110A, 110N) of any number of functionality groups may be configured to perform different or similar tasks to accomplish a goal of a solution group. The groups of computing devices (110A, 110N) may be divided into any number of groupings and may perform any number of different or similar functions without departing from the invention. For additional details regarding the computing devices (110A, 110N), See FIGS. 2 and 3.

In one or more embodiments of the invention, the configuration for each computing device may be determined based on the role of each computing device. In other words, a role of each computing device may determine a membership for the computing device in a functionality group. All computing devices having a similar role may be grouped into a functionality group. For additional details regarding functionality groups, See FIGS. 1B-1E.

In one or more embodiments of the invention, each functionality group may have an associated baseline configuration. The baseline configuration may specify the hardware, software (e.g., firmware and/or applications), and configurations of the hardware and software of user resources of a computing device. The baseline configuration may be enforced on all computing devices of the functionality group. As will be discussed in greater detail with respect to FIGS. 1B-1F, enforcing the baseline configuration on a computing devices of a functionality group may ensure the functionality of functionally dependent computing devices is provided by ensuring the uniformity of configuration of multiple computing devices.

In one or more embodiments of the invention, the computing devices (110A, 110N) are hardware devices. The each computing device may be, for example, a mobile phone, a tablet computer, a laptop computer, a desktop computer, a server, or a cloud resource. The computing device may include one or more processors, memory (e.g., random access memory), and persistent storage (e.g., disk drives, solid state drives, etc.). For additional details regarding the computing devices, See FIGS. 2-3.

While the system of FIG. 1 has been illustrated as including a limited number of components for the sake of brevity, the system may include additional components (not shown), fewer components, and/or different components (not shown), without departing from the invention.

Figure 1E:
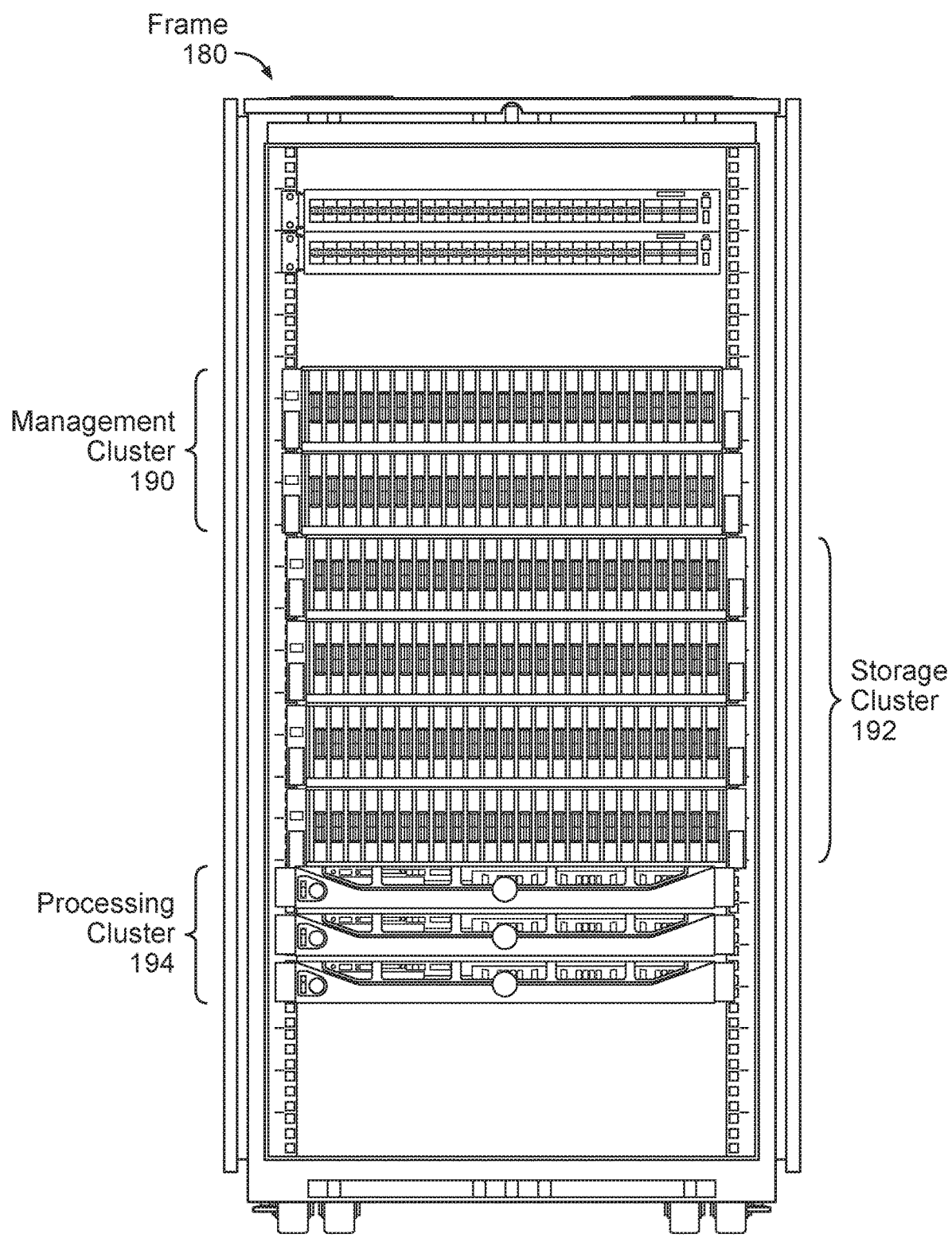
FIG. 1E shows a diagram of an example distributed system in accordance with one or more embodiments of the invention.

As discussed above, the computing devices (110A, 110N) may be divided into functionality groups as portions of a solution group. To further clarify the relationships between functionality groups and solution groups, FIGS. 1B-1D show relationship diagrams of functionality groups and solution groups in accordance with one or more embodiments of the invention. Additionally, FIG. 1E shows an example of a system to further clarify the relationships between functionality groups and solution groups.

FIG. 1B shows a first relationship diagram in accordance with one or more embodiments of the invention. In the first relationship diagram, a relationship between a functionality group A (130) and multiple computing devices (132, 134) is shown. As seen from the diagram, a logical group (e.g., 130) may include any number of computing devices (e.g., 132, 134). Each of the computing devices (132, 134) may have a role that indicates that computing devices are members of functionality group A (130).

FIG. 1C shows a second relationship diagram in accordance with one or more embodiments of the invention. In the second relationship diagram, a relationship between a solution group A (136) and multiple functionality groups (130, 138) is shown. As seen from the diagram, a solution group (e.g., 136) may include any number of functionality groups (e.g., 130, 138). As discussed above, a distributed system may be subdivided into any number of functionality groups to orchestrate the operation of the distributed system. Each of the functionality groups may be members of a solution group or members of multiple functionality groups. In other words, solution groups may have memberships. Each of the solution groups may provide or define a functionality provided by the respective solution group. The functionality group members of a solution group may provide or define a portion of the functionality of the solution group.

FIG. 1D shows a diagram an example functionality group (140) in accordance with one or more embodiments of the invention. In the diagram, the example functionality group (140) includes three computing devices (142, 144, 146). Each of the computing devices (142, 144, 146) may have a similar role that indicates that they are all members of the example functionality group (140).

To further clarify the relationships functionality groups and solution groups, FIG. 1E shows an example of a system in accordance with one or more embodiments of the invention. The example computing system includes a frame (180) for holding multiple groups of computing devices. More specifically, the frame (180) holds three groups of computing devices (190, 192, 194). Each group of computing devices (190, 192, 194) includes any number of computing devices.

Each computing device of each group of the three groups of computing devices (190, 192, 194) has the same role. For example, the computing devices of the management cluster (190) all have a management role. For example, the management cluster (190) may include two computing devices that both perform management functions. The computing devices of the storage cluster (192) all have a storage role. The computing devices of the processing cluster (194) all have a processing role. By virtue of their similar roles, the computing devices housed in the frame (180) are grouped into the three different functionality groups, e.g., management, storage, and processing.

Based on their memberships in different functionality groups, different baseline configurations for each functionality group are enforced on the computing devices of the respective groups. Doing so may reduce that likelihood that compatibility issues between different members of the same functionality group reduce the efficiency of providing the functionality of the functionality group.

Figure 2:
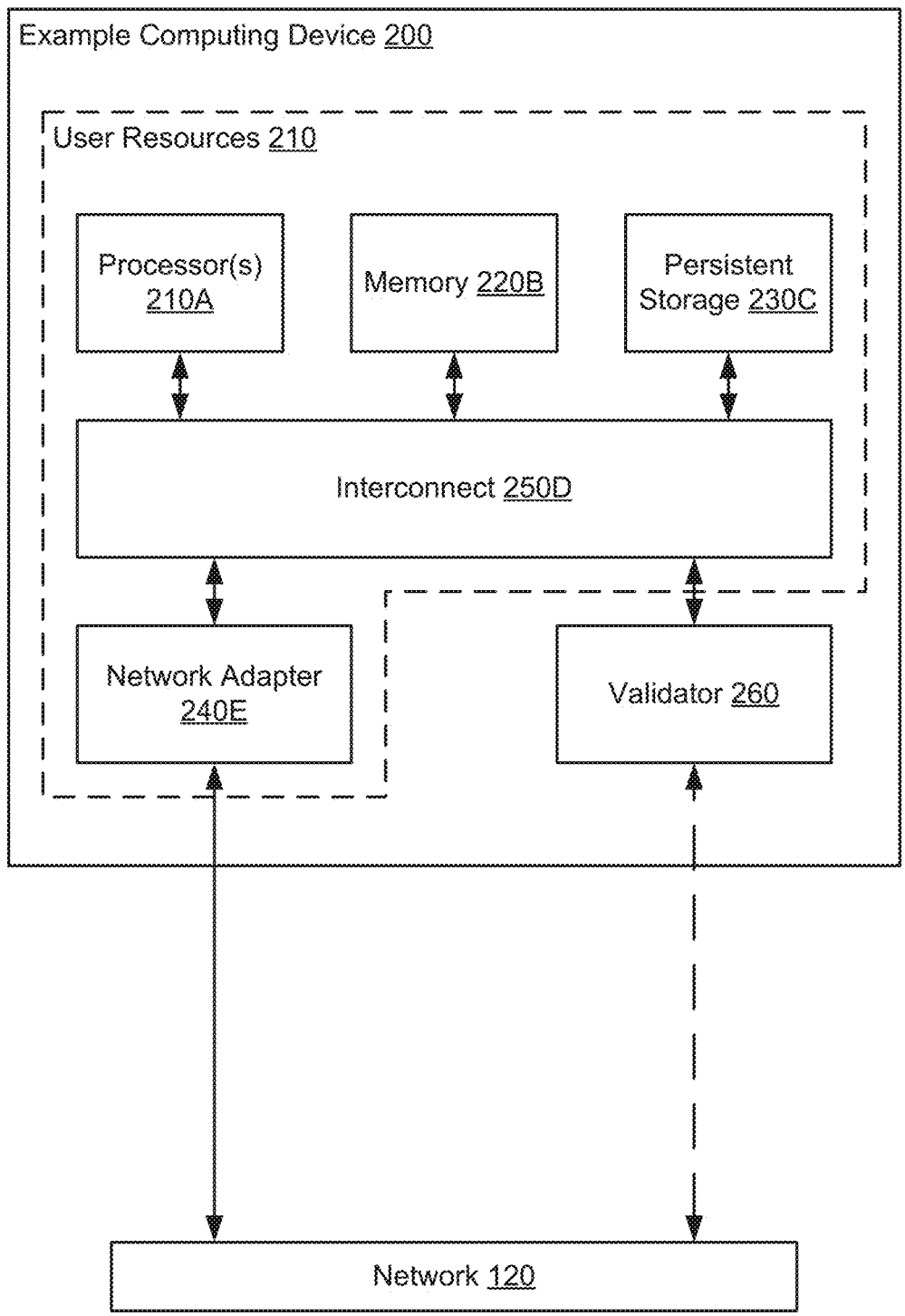
FIG. 2 shows a diagram of an example computing device hosting a validator in accordance with one or more embodiments of the invention.

As discussed above, different configurations may be enforced on different functionality groups of computing devices of the distributed system (e.g., 100, FIG. 1A). FIG. 2 shows a diagram of an example computing device (200) in accordance with one or more embodiments of the invention. The computing devices (e.g., 110A, 110N, FIG. 1A) of the distributed system (e.g., 110, FIG. 1A) may be similar to the example computing device (200).

In one or more embodiments of the invention, the example computing device (200) performs operations as part of a distributed system. For example, the example computing device (200) may run software, e.g., applications, deployed to the example computing device (200) that facilitates one or more functions of the distributed system.

In one or more embodiments of the invention, the example computing device (200) includes: (i) a mechanism for notifying another entity of a role of the computing device within a solution group without utilizing and/or interacting with user resources of the computing device and (ii) a software agent free mechanism to enforce a configuration on the user resources. Thus, another entity may identify a role of the computing device and enforce a configuration on the user resources of the computing without utilizing a software agent executing using user resources. Doing so may reduce the likelihood of the example computing device (200) being compromised by a third party that utilizes the functionality of a software agent executing on the example computing device (200).

In one or more embodiments of the invention, a software agent is a process or executable code executing using the user resources (210) that facilitates identifying of a role of the computing device and/or configuring of the user resources based on instructions, e.g., a configuration, from another entity. A software agent free user resources may be less susceptible to malicious attacks by third parties by virtue of having a reduced functionality exposed to third parties when compared to user resources that include a software agent.

To provide the above noted functionality, in one or more embodiments of the invention, the example computing device (200) includes user resources (210) and a validator (260). The user resources (210) may be controlled by a local user and the validator may be controlled by a remote user, e.g., a coordination point.

In one or more embodiments of the invention, the user resources (210) include processor(s) (210A), memory (220B), persistent storage (230C), a network adapter (240E), and an interconnect (250D).

The processor(s) (210A) may be, for example, central processing units, microcontrollers, or embedded computing devices such as digital signal processors, field programmable gate arrays, or application specific integrated circuits. The processors(s) (210A) maybe other types of digital processing devices without departing from the invention. Additionally, the processor(s) (210A) may execute program code stored in the persistent storage (230C) or other storages to run user applications.

The memory (220B) may be volatile memory such as, for example, dynamic random access memory or static random access memory. The memory (220B) may be non-volatile memory such as, for example, flash memory. The memory (210B) maybe other types of digital memory without departing from the invention.

The persistent storage (230C) may store data. The persistent storage (230C) may be, for example, hard disk drives, solid state drives, tape drives, or any combination thereof. The persistent storage (230C) may be other types of digital storage without departing from the invention.

Additionally, the persistent storage (230C) may store program code for user applications. In one or more embodiments of the invention, the program code stored in the persistent storage (230C) may be limited to harden the user resources against malicious attacks by third parties. In other words, the persistent storage (230C) may only include program code necessary to provide the functionality of a functionality group of which the example computing device (200) is a member. By limiting the included program code to that necessary to provide the functionality of the functionality group, the risk of malicious acts of third parties may be reduced by decreasing exposure of the example computing device (200) to third parties. The incremental inclusion of additional program code executed by processor(s) of the example computing device (200) may increase the exposure of the example computing device (200) to acts by third parties.

The network adapter (240E) may operably connect the example computing device (200) to, for example, a network or other computing devices and may be, for example, a network interface controller. The network adapter (240E) may be other types of devices for providing a network interface without departing from the invention.

The interconnect (250D) may provide operable connections between the other components of the user resources (210) and may be, for example, memory controllers, communication busses, and/or chipsets for providing inter-component communications. The chipsets may include a BIOS or other software for initializing and/or providing hardware access services to user application. The interconnect (250D) may be other types of hardware devices for providing communications between components without departing from the invention. Additionally, the interconnect (250D) may also be operably connected to the validator (260).

For the sake of brevity, the user resources (210) have been illustrated as including a limited number of hardware components. However, the user resources (210) may include any type and/or quantity of hardware components without departing from the invention.

In addition to the aforementioned hardware components, the user resources (210) may also include drivers, driver settings, or other software for controlling hardware components of the user resources (210). Further, each of the hardware and/or software components of the user resources (210) may be hardened to only execute a limited set of program code. In other words, the hardware and/or software components of the user resources (210) may include functionality to prevent the execution of code/perform functionality that is not pre-approved. For example, while not illustrated in FIG. 2, the user resources may include a trusted computing module, or other hardware/software element, for verifying that code/hardware functionality is pre-approved before the code is executed or the hardware functionality is invoked.

In one or more embodiments of the invention, the validator (260): (i) notifies entities of a role of the computing device and (ii) enforces configurations on the user resources (210). The enforcement may include: (a) obtaining a current configuration of the user resources (210), (b) determining whether the current configuration matches a predetermined configuration, e.g., a baseline configuration, and (c) modifying the user resources, based on the determination, to enforce the predetermined configuration on the user resources (210). In addition, the validator (260) may include separate computing resources for executing applications invoked by remote users.

In one or more embodiments of the invention, the validator (260) is controlled by a remote user via an operable connection. The validator (260) may advertise an internet protocol address, or other identifier, on a network that is separate from the internet protocol address of the example computing device (200). Thus, the validator (260) may distinguish itself from the example computing device (200) in the network environment and thereby enable other entities to address network (120) traffic to the validator (260). In one or more embodiments of the invention, the validator (260) is controlled by a coordination point. The validator (260) may be controlled by other entities without departing from the invention.

In one or more embodiments of the invention, the validator includes a network adapter than is separate from the network adapter (240E) of the user resources (210), as illustrated by the dashed arrow between the validator and the network (120) in FIG. 2. By including a separate network adapter, the validator (260) may communicate via the network (120) without utilizing the network adapter (240E) of the user resources (210). In one or more embodiments of the invention, the validator may utilize the network adapter (240E) of the user resources (210) via the interconnect (250D). Thus, in some embodiments of the invention, the validator (260) does not include a separate network adapter. For additional details regarding the validator (260), See FIG. 3.

While the example computing device (200) of FIG. 2 has been illustrated as including a limited number of components for the sake of brevity, the example computing device (200) may include additional components (not shown), fewer components, and/or different components (not shown) without departing from the invention. For example, the example computing device (200) may include user interface components, video processors, power supplies, and/or other components. The aforementioned components may be a portion of the user resources (210). Additionally, while illustrated as a single device, the example computing device (200) may be implemented as a logical device that utilizes the computing resources of one or more physical devices without departing from the invention.

As discussed above, a validator may facilitate identification and configuration of a computing device without interacting with user resources of the computing device.

Figure 3:
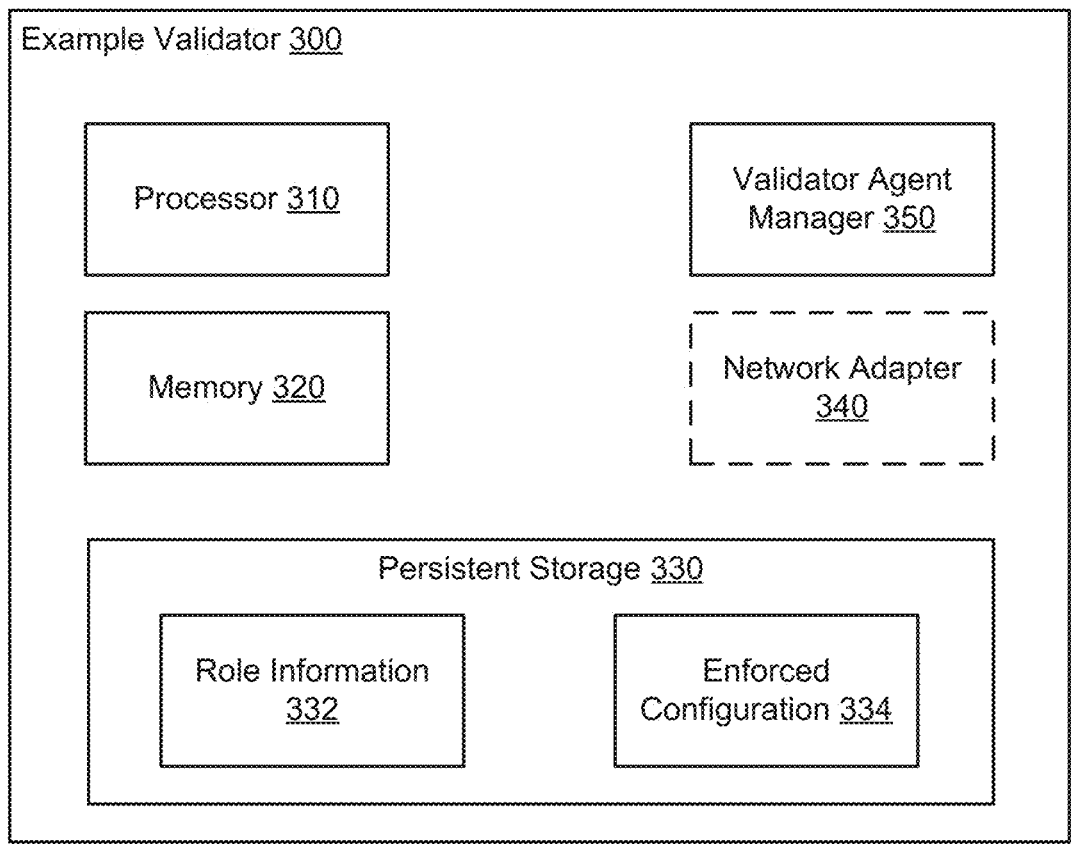
FIG. 3 shows a diagram of an example validator in accordance with one or more embodiments of the invention.

FIG. 3 shows a diagram of an example validator (300) in accordance with one or more embodiments of the invention. The validator (260, FIG. 2) of the example computing device (200, FIG. 2) may be similar to the example validator (300).

In one or more embodiments of the invention, the example validator (300) is a hardware device adapted to be hosted by a computing device. In one or more embodiments of the invention, hosted by means to be a separate physical distinguishable part of a device. The device may supply power, or provide other services, to the distinguishable part.

In one or more embodiments of the invention, the example validator (300) includes computing resources for performing operations. The computing resources may enable the example validator (300) to perform computations, store data, or perform other functions without utilizing the device hosting the example validator (300). Additionally, the computing resources of the example validator (300) may enable the example validator (300) to operate independently of a host computing device.

In one or more embodiments of the invention, the example validator (300) may be controlled by a remote user. The remote user may cause the example validator (300) to perform operations without invocation by a local user of the computing device hosting the example validator (300).

In one or more embodiments of the invention, the example validator (300) operably connects to a host computing device via an interconnect of the host or other internal communication system of the host computing system. The example validator (300) may issue commands to components of user resources of the host computing system without the commands being invoked by a local user. Thus, the example validator (300) may cause the user resources of the host computing system to perform operations, send data, or perform other functions without notifying the local user.

In one or more embodiments of the invention, the example validator (300) may enforce a configuration on a host computing device. For example, the example validator (300) may disable/enable hardware components, load firmware, modify firmware settings, and/or load/disable applications of the host computing device.

In one or more embodiments of the invention, the example validator (300) may obtain a configuration to be enforced on a host computing device from a remote user. The obtain configuration may specify any number of configuration elements to be enforced on the host computing device. The remote user may be, for example, a coordination point. The remote user may be other computing devices without departing from the invention.

To provide the aforementioned functionality, in one or more embodiments of the invention, the example validator (300) includes one or more of a processor (e.g., 310), memory (320), persistent storage (330), a network adapter (340), and a validator manager (350). The example validator (300) may include additional components without departing from the invention. In some embodiments of the invention, the example validator (300) may not include a network adapter (340). Each component of the example validator (300) is discussed below.

The processor (310) may be, for example, a central processing unit, a microcontroller, or embedded computing devices such as a digital signal processor, a field programmable gate array, or an application specific integrated circuit. The processors (310) may be other types of digital processing devices without departing from the invention. Additionally, the processor (310) may execute program code (not shown) stored in the persistent storage (330) or other storages to remote user applications.

The memory (320) may be volatile memory such as, for example, dynamic random access memory or static random access memory. The memory (320) may be non-volatile memory such as, for example, flash memory. The memory (320) maybe other types of digital memory without departing from the invention.

The persistent storage (330) may store data and may be/include, for example, hard disk drives, solid state drives, tape drives, or any combination thereof. The persistent storage (330) may be/include other types of digital storage devices without departing from the invention. Additionally, the persistent storage (330) may store data structures including role information (332) and an enforced configuration (334), e.g., a baseline configuration. The role information (332), and/or enforced configuration (334) may be used by the validator manager (350) when enforcing a configuration on user resources of a host computing device.

The role information (332) may include information regarding a role of a computing device hosting the example validator (300) without a solution group and/or functionality group. For example, the role information (332) may specify a function that the computing device hosting the example validator (300) is to perform. The role information (332) may be obtained, for example, when the example validator (300) is mounted in a computing device, when a computing device hosting the example validator (300) is shipped to a customer, and/or at any other time when a role for a computing device hosting the example validator (300) is determined. The role may be determined by, for example, a system architect, system administrator, or other user.

In one or more embodiments of the invention, the role information may specify one or more of a system type, a solution type, a cluster name, and a node name. A system type may be a type of a computing device. A solution type may specify a functionality provided by a distributed system to which the computing device belongs. A cluster name may by an identifier of a computing cluster in which the computing devices is deployed. The node name may be a unique logical name of the computing device. The role information may include addition, different, or less information without departing from the invention.

In one or more embodiments of the invention, the role information (332) may specify an identifier that is associated with a solution group and a functionality group of the solution group. In other words, when a solution group is being prepared for deployment different computing devices of the solution group may be given different roles. In such a scenario, each role may be associated with the solution group and a functionality group of the solution group. Different roles may be associated with different functionality groups. Using the identifier specified by the role information (332), a functionality group associated with the role may be identified.

The enforced configuration (334) may specify any combination of hardware, firmware, configuration settings, and/or applications of the user resources of a host computing device. The enforced configuration (334) may specify, for example, a version number of a solid state drive of the user resources, configuration settings for a driver of the solid state drive, and an application that stores data in the solid state drive. The enforced configuration (334) may specify other combinations of hardware, software, firmware, and associated settings without departing from the invention.

While illustrated in FIG. 3 as being separate data structures stored on a persistent storage (330) of the example validator (300), the role information (332) and enforced configuration (334) may be divided into any number of portions, combined with other data, and/or stored all or in part in other locations, e.g., other devices, without departing from the invention.

In one or more embodiments of the invention, the network adapter (340) connects the example validator (300) to a network or other computing devices and may be, for example, a network interface controller. The network adapter (340) may be other types of devices for providing a network interface without departing from the invention. In FIG. 3, the network adapter (340) is illustrated in dashing to indicate that it is not present in some embodiments of the invention. As discussed with respect to FIG. 2, in some embodiments of the invention, a validator (e.g., 300) may utilize a network adapter of a host computing device to communicate with other devices via a network.

In one or more embodiments of the invention, the validator manager (350) initializes and/or orchestrate the operation of the example validator (300) and may be implemented using, for example, memory controllers, communication busses, and/or chipsets for providing inter-component communications and/or orchestration. The chipsets may include a BIOS or other software for initializing and/or providing hardware access services to application. The validator manager (350) may be implemented using other types of hardware devices for providing communications between components and/or orchestration without departing from the invention.

In one or more embodiments of the invention, the validator manager (350): (i) identify a role of a computing device hosting the example validator (300) and (ii) enforce the enforced configuration (334) on the computing device hosting the example validator (300). The validator manager (350) may provide less, additional, and/or different functionality without departing from the invention. In one or more embodiments of the invention, the validator manager (350) may perform all or a portion of the methods illustrated in FIGS. 5A-6B.

While the example validator (300) has been described as a physical device, the example validator (300) may be implemented as computing instructions performed by a processor of a computing device without departing from the invention. For example, a host computing device may be executing a hypervisor running two virtual machines. A first virtual machine may execute user applications and the second virtual machine may perform the functions of the example validator (300).

While the example validator (300) of FIG. 3 has been illustrated as including a limited number of components for the sake of brevity, the example validator (300) may include additional components (not shown), fewer components, and/or different components (not shown), without departing from the invention. Additionally, while illustrated as a single device, the example validator (300) may be implemented as a logical device that utilizes the computing resources, e.g., processor, memory, persistent storage, etc., of one or more physical devices without departing from the invention.

Figure 4:
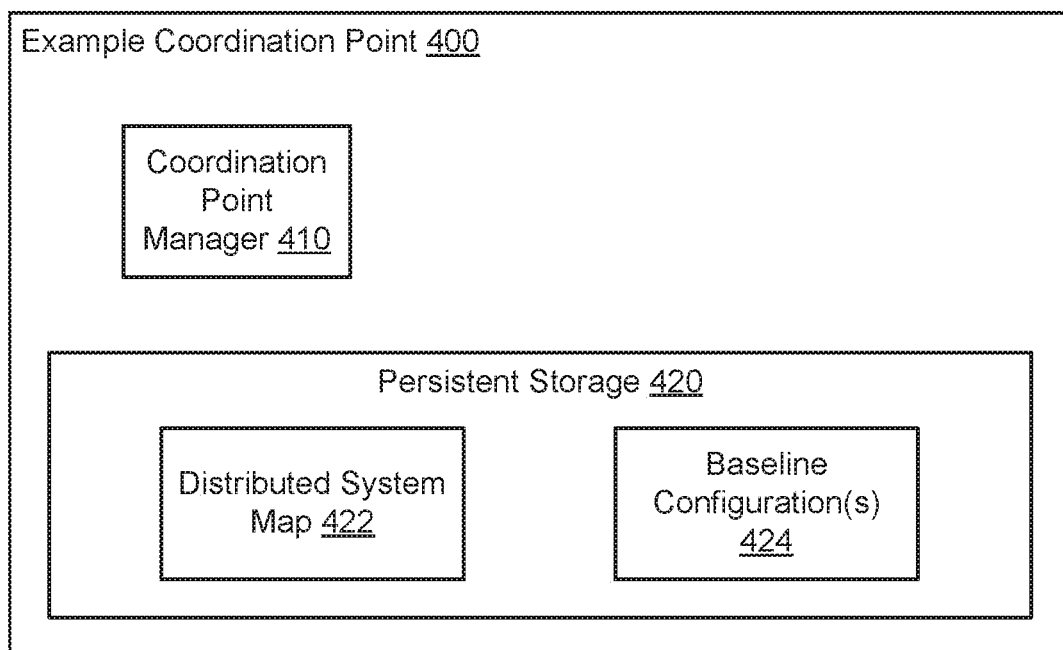
FIG. 4 shows a diagram of an example coordination point in accordance with one or more embodiments of the invention.

As discussed with respect to FIG. 1A, in one or more embodiments of the invention a coordination point may be used to enforce configurations on user resources of computing devices. FIG. 4 shows a diagram of an example coordination point (400) in accordance with one or more embodiments of the invention. The coordination point (100) of FIG. 1A may be similar to the example coordination point (400)

The example coordination point (400) may: (i) identify roles of computing devices of a distributed system, (ii) group the computing devices based on the identified roles, and (iii) enforce configurations associated with each group of computing devices on the computing devices of the respective groups. The example coordination point (400) may initiate the enforcement of the configurations by sending the configurations to respective validators of the computing devices. In other words, the example coordination point (400) may send different configurations to validators of different groups of computing devices. The example coordination point (400) may provide less, additional, and/or different functionality without departing from the invention. In one or more embodiments of the invention, the example coordination point (400) may perform all or a portion of the methods illustrated in FIGS. 5A-6B.

To provide the aforementioned functionality, the example coordination point (400) may include a coordination point manager (410) and a persistent storage (420). The coordination point manager (410) may perform all or a portion of the methods illustrated in FIG. 5A-6B.

In one or more embodiments of the invention, the functionality of the coordination point manager (410) is provided by any combination of hardware components, firmware, and/or software instructions, e.g., applications. The hardware components may include circuitry. The software instructions may be executed by the hardware components and may cause the hardware components to provide the functionality of the coordination point manager (410) described throughout this application.

The persistent storage (420) may store data and may be/include, for example, hard disk drives, solid state drives, tape drives, or any combination thereof. The persistent storage (420) may be/include other types of digital storage devices without departing from the invention. Additionally, the persistent storage (420) may store data structures including a distributed system map (422) and baseline configuration(s) (424). The distributed system map (422) and baseline configuration(s) (424) may be used by the coordination point manager (410) when deploying computing devices.

The distributed system map (422) may include associations between roles and functionality groups of a solution group. For example, the distributed system map (422) may specify that any computing devices having a first role are associated with a first functionality group, any computing devices having a second role are associated with a second functionality group, etc. The distributed system map (422) may include any number of associations and specify the associations at any level of granularity without departing from the invention.

The baseline configuration(s) (424) may specify configurations to be enforced on computing devices. Each configuration specified by the baseline configuration(s) (424) may be associated with a functionality group specified by the distributed system map (422). Each configuration specified by the baseline configuration(s) (424) may specify any combination of hardware, software, firmware, and settings for user resources of computing devices.

In one or more embodiments of the invention, each configuration specifies a different combination of hardware, software, firmware, and settings. In other words, each configuration represents a unique specification. In some embodiments of the invention, each of the configurations is not unique. In other words, the configuration association with a first functionality group may be the same as a second configuration associated with a second functionality group.

In one or more embodiments of the invention, each configuration does not specify all hardware, software, firmware, and configurations of user resources of a computing device. Rather, each configuration may specify only a portion of the hardware, software, firmware, and configurations of user resources of a computing device.

While illustrated in FIG. 4 as being separate data structures stored on a persistent storage (420) of the example coordination point (400), the distributed system map (422) and baseline configuration(s) (424) may be divided into any number of portions, combined with other data, and/or stored all or in part in other locations, e.g., other computing devices, without departing from the invention.

As discussed above, the system shown in FIG. 1A may facilitate the deployment of a distributed system without utilizing a software agent executing using user resources of computing devices of the distributed system. To facilitate the deployment of the distributed system, the method illustrated in FIG. 5A may be performed.

Figure 5A:
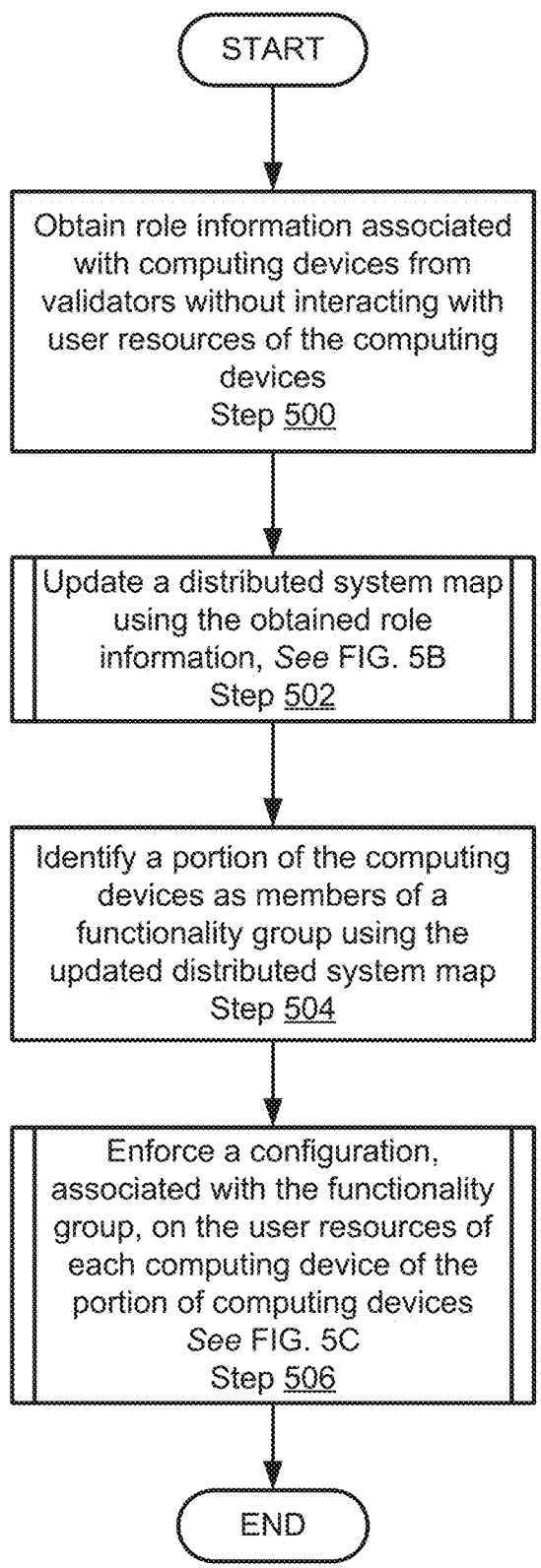
FIG. 5A shows a diagram of a flowchart of a method of configuring computing devices in accordance with one or more embodiments of the invention.

FIG. 5A shows a flowchart of a method in accordance with one or more embodiments of the invention. The method depicted in FIG. 5A may be used to configuration computing devices in accordance with one or more embodiments of the invention. The method shown in FIG. 5A may be performed by, for example, an example coordination point (400, FIG. 4). Other component of the system illustrated in FIG. 1A may perform the method of FIG. 5 without departing from the invention.

In Step 500, role information associated with a plurality of computing devices is obtained from validators without interacting with user resources of the plurality of computing devices.

In one or more embodiments of the invention, the role information is obtained by sending requests to the validators of the plurality of computing devices. The role information of each computing device of the plurality of computing devices may be provided to the example coordination point, or another entity that aggregates the response, in response to the requests. The obtained role information of the plurality of computing devices may then be aggregated. Each portion of the aggregated obtained role information may be associated with a computing device hosting a validator from which the role information was obtained.

In Step 502, a distributed system map is updated using the obtained role information.

In one or more embodiments of the invention, the distributed system map is updated by associating one or more computing devices with one or more functionality groups. For example, groups of computing devices having common role information may be associated with functionality groups associated with the common role information.

Figure 5B:
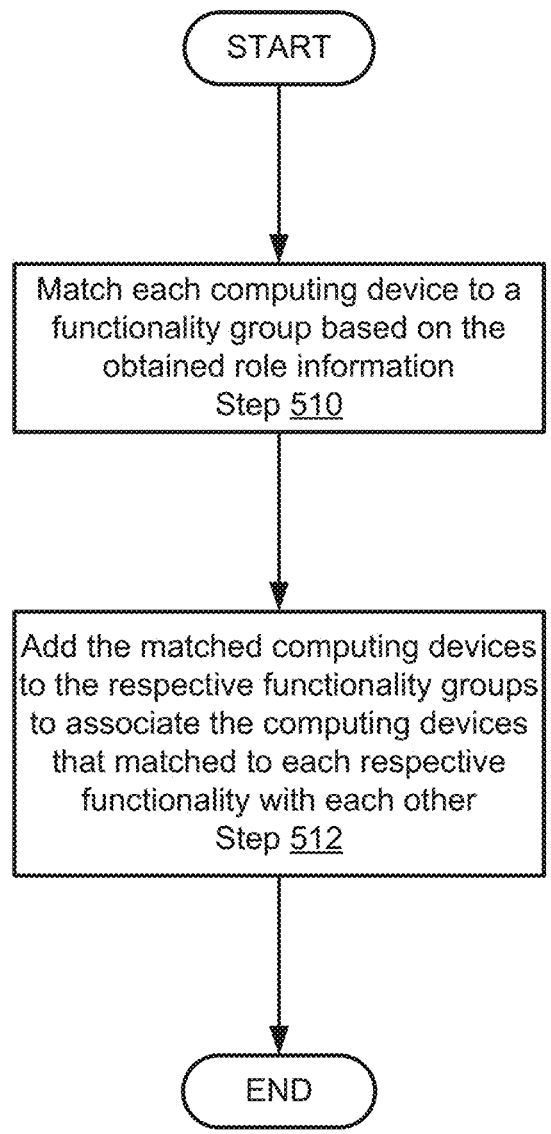
FIG. 5B shows a diagram of a flowchart of a method of updating a distributed system map in accordance with one or more embodiments of the invention.

In one or more embodiments of the invention, the distributed system map is updated via the method illustrated in FIG. 5B. The distributed system map may be updated using other methods without departing from the invention.

In Step 504, a portion of the plurality of computing devices is identified as members of a functionality group using the updated distributed system map.

In one or more embodiments of the invention, the portion of the plurality of computing devices is identified based on a common role. In other words, all computing devices of a distributed system having the same, predetermined role may be identified as the portion of the plurality of computing devices.

In Step 506, a configuration, associated with the functionality group, is enforced on the user resources of each computing device of the identified portion of the plurality of computing devices.

In one or more embodiments of the invention, enforcing the configuration on the user resources includes enabling/disabling hardware, loading/disabling firmware, updating firmware settings, and/or loading/removing/disabling applications of the user resources. The enforcement may be performed to modify the user resources to match the configuration.

Figure 5C:
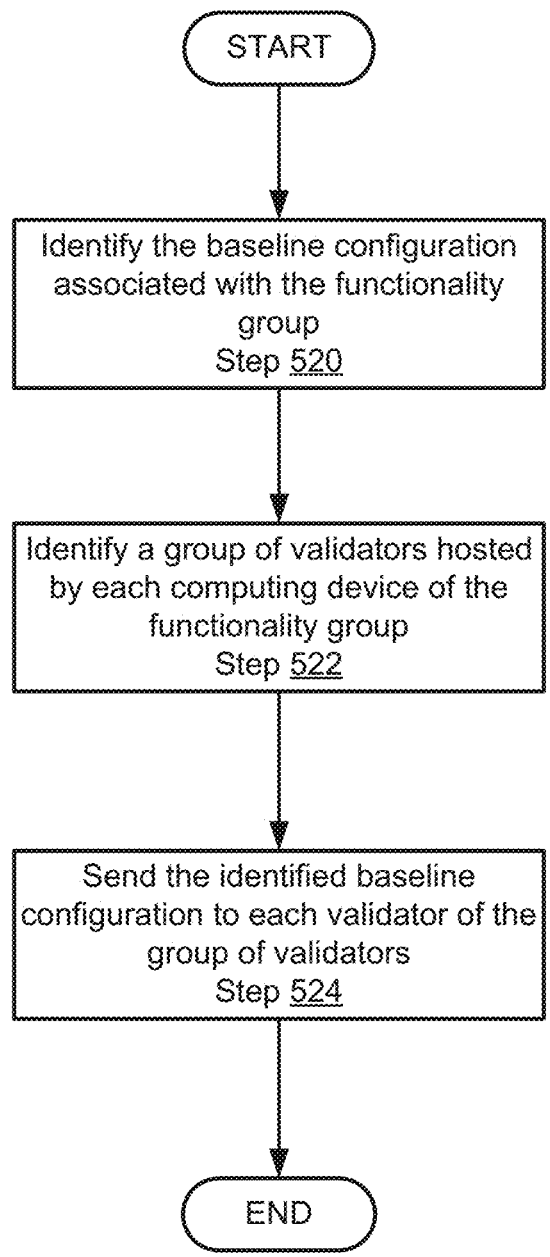
FIG. 5C shows a diagram of a flowchart of a method of enforcing a configuration on user resources of a computing device in accordance with one or more embodiments of the invention.

In one or more embodiments of the invention, the configuration is enforced via the method illustrated in FIG. 5C. The configuration may be enforced via other methods without departing from the invention.

The method may end following Step 506.

While Steps 504 and 506 may configure a portion of the computing devices of a distributed system, all of the computing devices of a distributed system may be configured by repeating steps 504 and 506 for different portions until all of the computing devices are configured.

FIG. 5B shows a flowchart of a method in accordance with one or more embodiments of the invention. The method depicted in FIG. 5B may be used to update a distributed system map in accordance with one or more embodiments of the invention. The method shown in FIG. 5B may be performed by, for example, an example coordination point (400, FIG. 4). Other component of the system illustrated in FIG. 1A may perform the method of FIG. 5B without departing from the invention.

In Step 510, each computing device is matched to a functionality group based on the obtained role information.

As described with respect to FIGS. 1B and 4, role information may be uniquely associated with a functionality group. In other words, each functionality group may have members that have the role associated with the functionality group.

For example, a first functionality group may have an associated role of data parsing and a second functionality group may have an associated role of data storage. Computing devices having role information that specifies data parsing may be matched to the first functionality group and other computing devices that have role information that specifies data storage may be matched to the second functionality group.

In Step 512, the matched computing devices are added to the respective functionality groups to associate the computing devices that matched to each respective functionality group with each other.

In one or more embodiments of the invention, the computing devices are added to the respective functionality groups by adding an identifier of each computing device to a distributed system map. The identifiers may be added to associate all of the computing devices that matched each functionality group with the respectively matched functionality group. Thus, after adding the identifiers, the distributed system map may include each functionality group, identifiers of computing devices associated with each functionality group, and/or the associations between the identifiers and respective functionality group.

The method may end following Step 512.

FIG. 5C shows a flowchart of a method in accordance with one or more embodiments of the invention. The method depicted in FIG. 5C may be used to enforce a configuration in accordance with one or more embodiments of the invention. The method shown in FIG. 5C may be performed by, for example, an example coordination point (400, FIG. 4). Other component of the system illustrated in FIG. 1A may perform the method of FIG. 5C without departing from the invention.

In Step 520, a baseline configuration associated with a functionality group is identified.

As described with respect to FIG. 4, any number of baseline configurations may be stored in a persistent storage. Each of the baseline configurations may be associated with functionality groups specified by a distributed system map, also stored in the persistent storage. The aforementioned data structures may be stored in different persistent storages without departing from the invention.

In one or more embodiments of the invention, the baseline configuration is identified based on the associations between the functionality groups of the distributed system map and the stored baseline configurations. In other words, for a given functionality group, the baseline configuration may be identified based on its associations with the functionality group.

In one or more embodiments of the invention, the identified baseline configuration specified any combination of hardware, firmware, applications, and/or settings for the hardware, firmware, and/or applications.

In Step 522, a group of validators hosted by each computing device of the functionality group is identified.

As described with respect to FIG. 4, the distributed system map may include identifiers of computing devices of each functionality group. The computing devices of the functionality group may be identified using the identifiers of the functionality group.

As described with respect to FIG. 2, each computing device of a distributed system may host a validator. Thus, by knowing which computing devices are members of a functionality group, the group of validators may also be identified by virtue of their association with the host computing devices.

In Step 524, the identified baseline configuration is sent to each validation of the identified group of validators.

In one or more embodiments of the invention, sending the baseline configuration agent to a validator instructs the validator to enforce the configuration specified by the baseline configuration on the user resources of the computing device hosting the validator.

In one or more embodiments of the invention, sending the baseline configuration initiates enforcement of the configuration specified by the baseline configuration on the user resources of the computing device hosting the validator to which the baseline configuration was sent.

The method may end following Step 512.

As discussed with respect to FIG. 3, a validator may provide role information of a computing device hosting the validator. Doing so may enable a role of the computing device to be determined without interacting with user resources of the computing device hosting the validator.

Figure 6A:
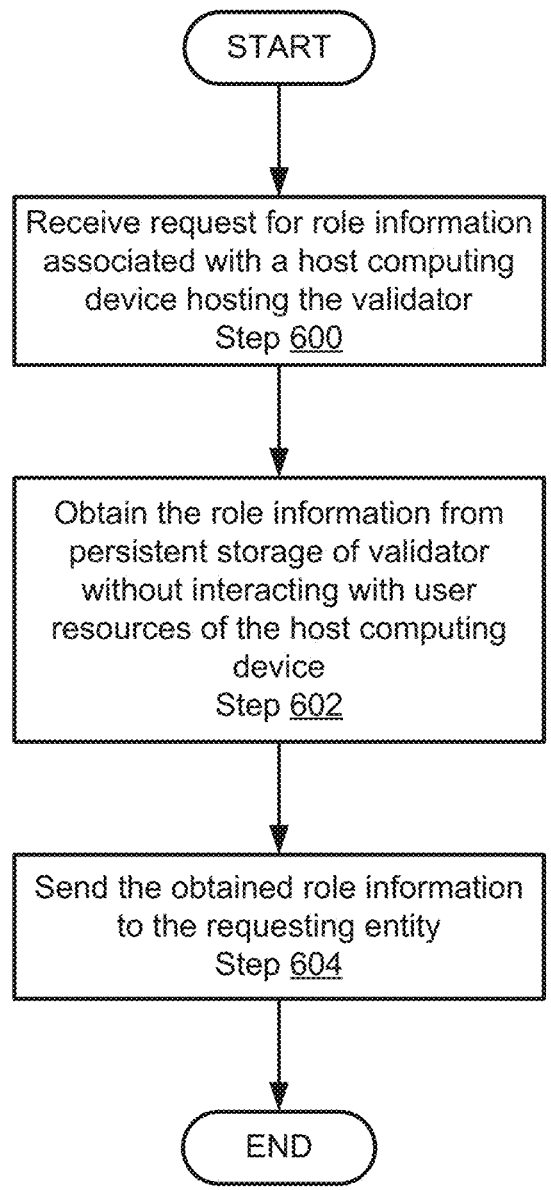
FIG. 6A shows a diagram of a flowchart of a method of providing role information of a computing device in accordance with one or more embodiments of the invention.

FIG. 6A shows a flowchart of a method in accordance with one or more embodiments of the invention. The method depicted in FIG. 6A may be used to identify a role of a computing device without interacting with user resources of the computing device in accordance with one or more embodiments of the invention. The method shown in FIG. 6A may be performed by, for example, an example validator (300, FIG. 3). Other component of the system illustrated in FIG. 1A may perform the method of FIG. 6A without departing from the invention.

In Step 600, a request for role information of computing devices is obtained by a validator hosted by the computing device.

In one or more embodiments of the invention, the request is obtained by receiving the request. The request may be sent by a coordination point. Other computing devices may send the request without departing from the invention.

In one or more embodiments of the invention, sending means to originate packets including the request in a network. The packets including the request may be transmitted over the network via any number of devices before reaching a recipient, e.g., a validator.

In one or more embodiments of the invention, the originated packets are addressed to the validator that obtained the request. In other words, the originated packets may be addressed to a validator rather than a computing device that hosts the validator.

In one or more embodiments of the invention, the originated packets are addressed to a computing device host the validator that obtained the request. A network adapter of the computing device may have functionality to prescreen packets addressed to the computing device to determine whether the packets should be forwarded to the validator. In such a scenario, the network adapter of the computing device may forward the packets to the validator without notifying an operating system, or other application, executing using user resources of the computing device hosting the validator.

In Step 602, the role information is obtained from a persistent storage of the validator that obtained the request without interacting with user resources of the host computing device.

As described with respect to FIG. 3, the validator may include a persistent storage, separate from the user resources of the computing device hosting the validator, that stores role information of the computing device hosting the validator.

In Step 604, the obtained role information is sent to the requesting entity.

The role information may be sent to the requesting entity via a network. The request entity may be a coordination point. The requesting entity may be other computing devices without departing from the invention.

The method may end following Step 604.

As discussed with respect to FIG. 3, a validator may enforce a configuration on user resources of a computing device hosting the validator. Doing so may reduce the likelihood of compatibility issues with other computing devices of a functionality group.

Figure 6B:
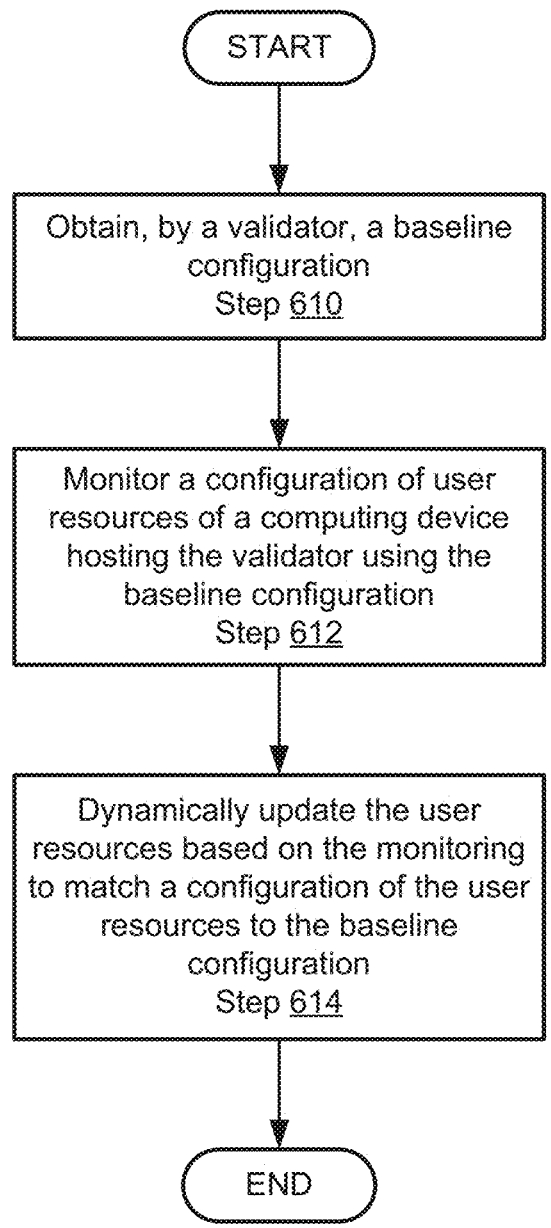
FIG. 6B shows a diagram of a flowchart of a method of updating user resources in accordance with one or more embodiments of the invention.

FIG. 6B shows a flowchart of a method in accordance with one or more embodiments of the invention. The method depicted in FIG. 6B may be used to enforce a configuration on user resources of a computing device in accordance with one or more embodiments of the invention. The method shown in FIG. 6B may be performed by, for example, an example validator (300, FIG. 3). Other component of the system illustrated in FIG. 1A may perform the method of FIG. 6B without departing from the invention.

In Step 610, a baseline configuration is obtained.

In one or more embodiments of the invention, the baseline configuration is obtained by receiving it from a coordination point. The baseline configuration may be obtained from other entities without departing from the invention.

In one or more embodiments of the invention, the baseline configuration is associated with a role of the computing device hosting the validator.

In Step 612, a configuration of user resources of a computing device hosting the validator is monitored using the obtained baseline configuration.

In one or more embodiments of the invention, the configuration of the user resources of the computing device is the combination of hardware, firmware, applications, and/or settings of the hardware, firmware and/or applications of the user resources.

In one or more embodiments of the invention, the configuration of the user resources is monitored by comparing the configuration to the obtained baseline configuration. The monitoring may be performed at regular intervals or in response to predetermined events. The monitoring may be performed using other schedules or no schedule without departing from the invention.

In one or more embodiments of the invention, only a portion of the user resources specified by the baseline configuration are monitored. For example, the user resources may include additional elements than those specified by the baseline configuration. In such a scenario, the monitoring may only be performed for the user resources that correspond to the elements specified by the baseline configuration.

For example, consider a scenario in which the baseline configuration only specifies model numbers of a solid state drive. In such a scenario, the monitoring may only include identification of the model numbers of solid state drives of the user resources and comparison of the identified model numbers to the model numbers specified by the baseline configuration. Other hardware elements such as, for example, processors may not be monitored. In other words, in the aforementioned scenario, the monitoring may not include identification of a type or model number of a processor because the baseline configuration did not include a specification for the aforementioned element of the user resources.

In Step 614, the user resources are dynamically updated based on the monitoring to match a configuration of the user resources to the baseline configuration.

In one or more embodiments of the invention, dynamic updating includes disabling/enabling hardware, deleting/disabling/loading firmware, deleting/disabling/loading applications, and/or modifying settings of hardware, firmware, and/or applications of the user resources. The dynamic updating may match the user resources to the baseline configuration. In other words, the dynamic updating may modify the user resources so that each element of the user resources matches that of an element specified by the baseline configuration.

In one or more embodiments of the invention, dynamic updating is performed as differences between the configuration of the user resources and the baseline configuration are identified. In other words, the updating of the user resources may be performed dynamically at any point in time after a difference is identified.

In one or more embodiments of the invention, the updating is performed at predetermined time intervals. For example, the updating may be performed once an hour. In such a scenario, all or a portion of the differences between the configuration of the user resources and the baseline configuration may be eliminated at the same time via an update of multiple elements of the user resources. In other words, initiation of updating of multiple elements of the user resources may occur at the same, predetermined time.

The method may end following Step 614.

While the methods illustrated in FIG. 5A-6B are shown as a series of steps, any number of the steps may be omitted, performed in parallel, performed in a different order, and/or performed repeatedly without departing from the invention.

To further clarify embodiments of the invention, a non-limiting example is provided below.

Example 1

Figure 7A:
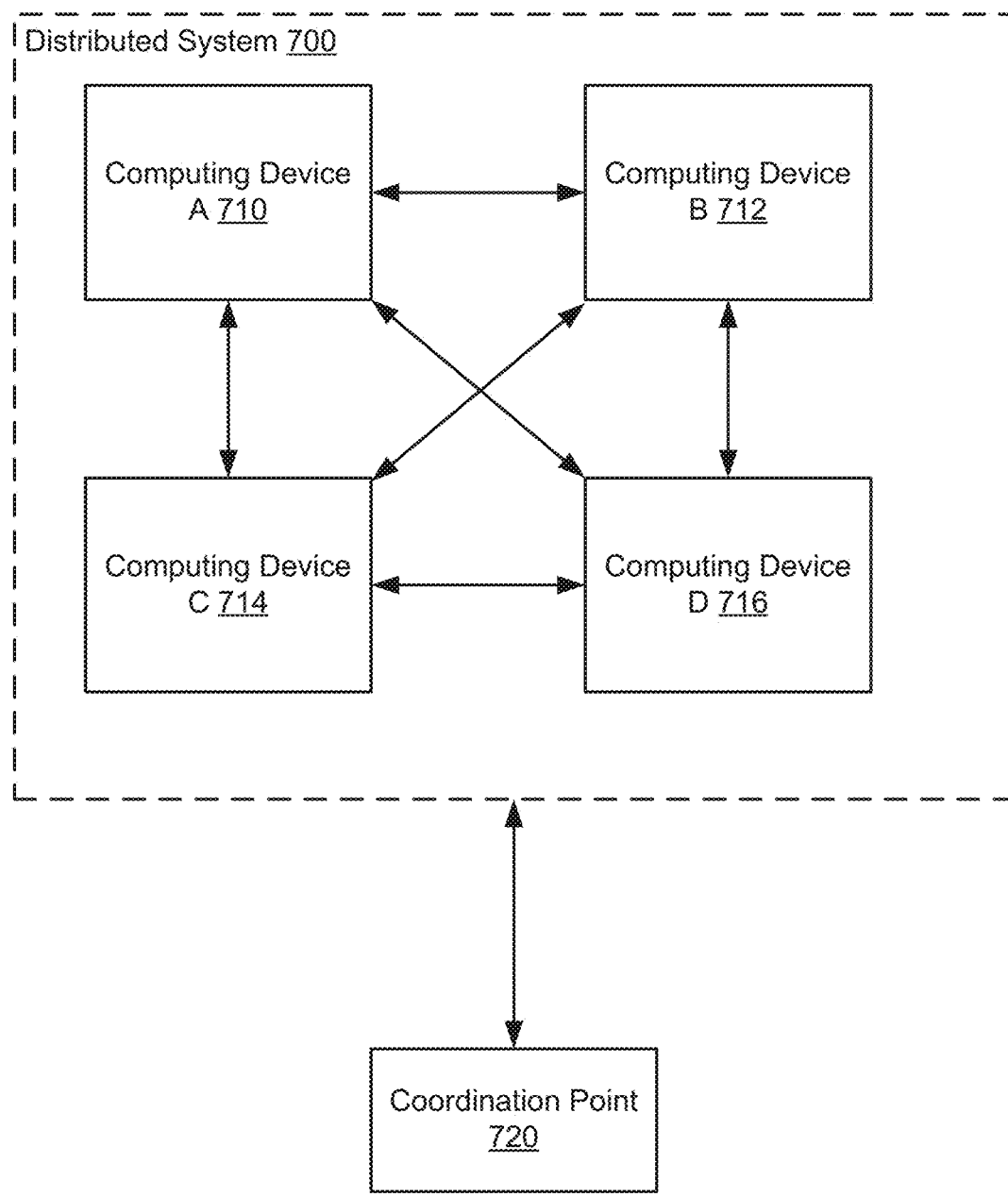
FIG. 7A shows a diagram of an example system.

Consider a deployment scenario as illustrated in FIG. 7A. Shows a diagram of a system including a distributed system (700) and a coordination point (720). The distributed system (700) includes computing devices (710, 712, 714, 718) that are in a pre-configuration state. In other words, the computing devices have not been configured to provide functionality of the distributed system (700).

In the aforementioned scenario, the coordination point (720) obtains role information from validators (not shown) hosted by the computing devices (710, 712, 714, 718). Obtaining the role information enables the coordination point (720) to identify a role of each computing device (710, 712, 714, 718) without interacting with user resources of the computing devices (710, 712, 714, 718).

In the aforementioned scenario, the validation hosted by computing device A (710) provided role information of "computation manager" while the validators hosted by the remaining computing devices (712, 714, 716) provided role information of "computation node". Utilizing the aforementioned information, the coordination point (720) identified a first functionality group associated with the "computation manager" role and a second functionality group associated with the "computation node" role. Each of these functionality groups are associated with different baseline configurations.

FIG. 7B shows a table illustrating the associations between the roles and baseline configurations. As seen from FIG. 7B, row 2, the role "computation manager" is associated with a baseline configuration that minimizes connectivity between the computing device of the first functionality group and computing devices of other functionality groups. In contrast, the role "computation node" is associated with a baseline configuration that maximizes connectivity of the computing devices of the second functionality group. Each of these baseline configuration specified the connectivity (not shown) between computing devices of each functionality group.

Using the baseline configurations of FIG. 7B, the coordination point (720, FIG. 7A) enforced the configuration on the computing devices (710, 712, 714, 718, FIG. 7A) of the distributed system (700, FIG. 7A). To enforce the baseline configurations, the coordination point (720, FIG. 7A) sent the baseline configuration to the validators hosted by the computing devices (710, 712, 714, 718, FIG. 7A). The validators modified the user resources of the computing devices (710, 712, 714, 718, FIG. 7A) to match the baseline configuration.

Figure 7C:
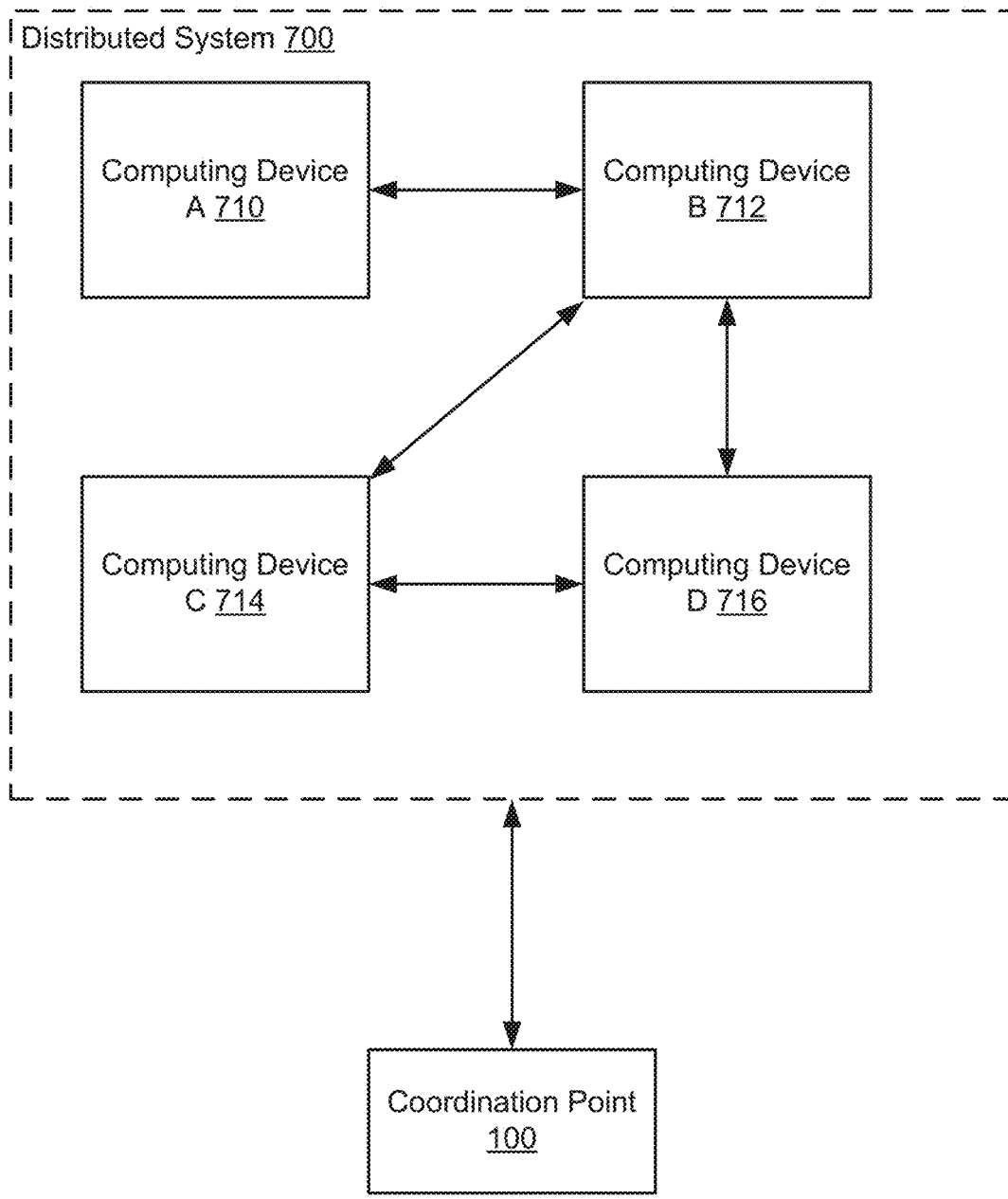
FIG. 7C shows a diagram of the example system of FIG. 7A after configuring computing devices of the example system.

FIG. 7C shows a diagram of the system of FIG. 7A after enforcement of the baseline configurations by the validators. As seen from FIG. 7C, the connections between the computing devices have been modified. Specifically, the connectivity between computing device A (710) and the other computing devices (712, 714, 716) has been minimized in accordance with the baseline configurations of FIG. 7B.

By modifying the connectivity between the computing devices (710, 712, 714, 716) as seen in FIG. 7C, the different functionality groups of the distributed system (700) are configured to have a common configuration that reduces the likelihood of incompatibility between the computing devices of the respective functionality group.

End of Example 1

Figure 8:
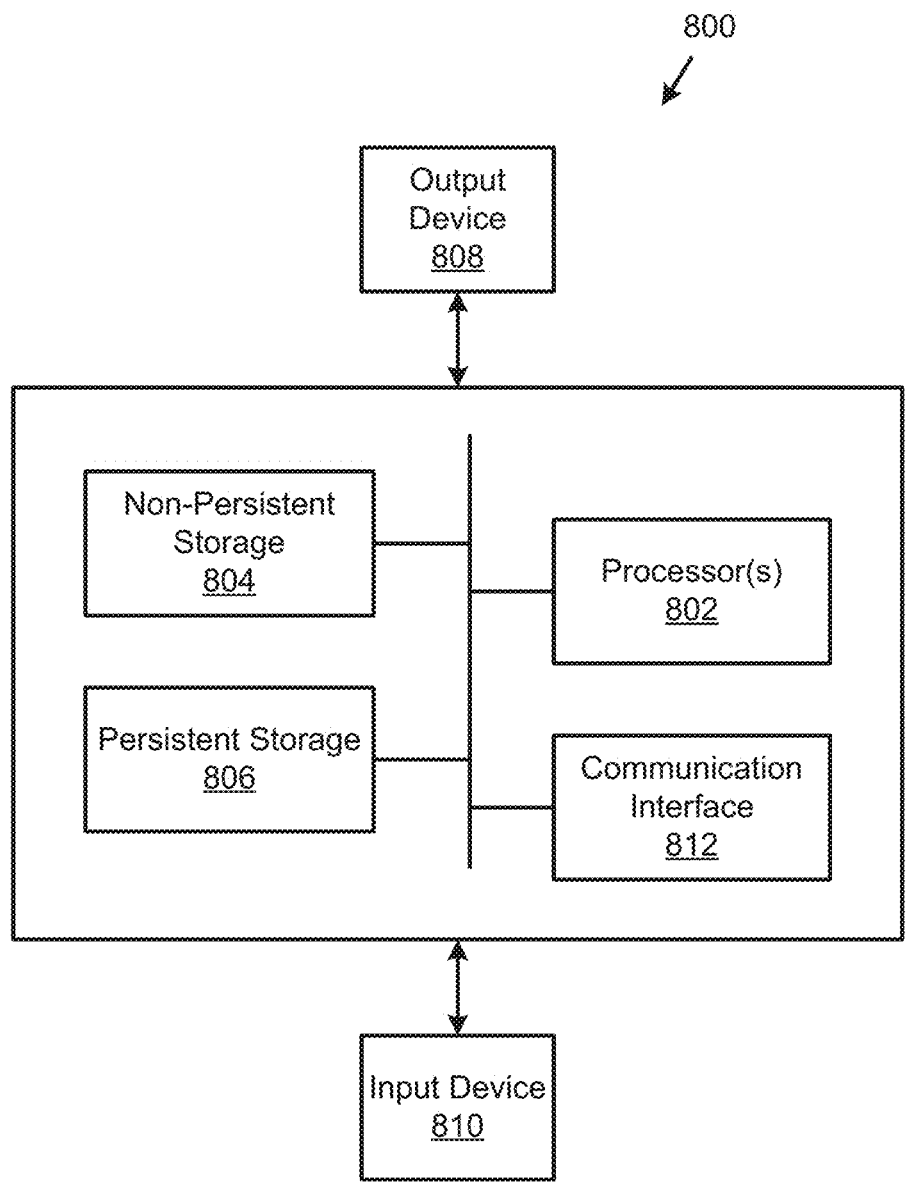
FIG. 8 shows a diagram of a computing device not hosting a validator in accordance with one or more embodiments of the invention.

As discussed above, embodiments of the invention may be implemented using computing devices. FIG. 8 shows a diagram of a computing device that does not host a validator in accordance with one or more embodiments of the invention. The computing device illustrated in FIG. 8 could also host a validator without departing from the invention. The computing device (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), input devices (810), output devices (808), and numerous other elements (not shown) and functionalities. Each of these components is described below.

In one embodiment of the invention, the computer processor(s) (802) may be an integrated circuit for processing instructions. For example, the computer processor(s) may be one or more cores or micro-cores of a processor. The computing device (800) may also include one or more input devices (810), such as a touchscreen, keyboard, mouse, microphone, touchpad, electronic pen, or any other type of input device. Further, the communication interface (812) may include an integrated circuit for connecting the computing device (800) to a network (not shown) (e.g., a local area network (LAN), a wide area network (WAN) such as the Internet, mobile network, or any other type of network) and/or to another device, such as another computing device.

In one embodiment of the invention, the computing device (800) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many different types of computing devices exist, and the aforementioned input and output device(s) may take other forms.

Embodiments of the invention may improve the performance of computations, data storage, and/or communications in a network environment by reducing the chance of compatibility issues between computing devices. The compatibility issues may be reduced by enforcing a configuration on a computing devices. Embodiments of the invention may provide a software agent free method of enforcing the configuration on the user resources and, consequently, reduce the likelihood of malicious third party interference with the computing devices. Doing so may be accomplished by reducing the exposure of the computing device to third parties. Additionally, embodiments of the invention may reduce the likelihood of a malicious actor compromising a computing devices by enabling a role of a computing device to be identified without utilizing user resources. Doing so enables the user resources to be hardened against malicious attacks while still enabling a role of the computing device to be identified. Embodiments of the invention may provide the aforementioned functionality by utilizing a hardware agent that is separately operable from the user resources of the computing device. Thus, embodiments of the invention may improve the security of a computing devices and the efficiency of computations performed by multiple computing devices in a distributed system.

Accordingly, one or more embodiments of the invention address the problem of misconfiguration of computing devices in a distributed system that would otherwise reduce the performance of the distributed system. Further, one or more embodiments of the invention, address the problem of malicious attacks by third parties by reducing the exposure of user resources of computing devices to the third parties. The aforementioned problem arises due to the nature of the technological environment in which distributed systems operate. For example, the problem of exposure to third parties necessarily arises in the context of distributed computing environment that rely on interconnectivity for providing cooperative functionality of the distributed computing environment. Similarly, misconfiguration of computing devices in a distributed system arises due to the environment: a distributed environment where the functionality of the distributed system is only possible through communications between computing devices of the distributed environment.

While embodiments of the invention have been described as addressing one or more problems, embodiments of the invention are applicable to address other problems and the scope of the invention should not be limited to addressing the problems specifically discussed throughout this application.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A coordination point, comprising:
    a persistent storage comprising a distributed system map; and
    a processor programmed to:
        obtain role information associated with a plurality of computing devices from a plurality of validators without interacting with user resources of the plurality of computing devices, wherein the plurality of validators execute using computing resources separate from the user resources;
        update the distributed system map using the obtain role information;
        identify a portion of the plurality of computing devices as members of a functionality group using the updated distributed system map and
        enforce a configuration, associated with the functionality group, on the user resources of each computing device of the portion of the plurality of computing devices.

2. The coordination point of claim 1, wherein the distributed system map comprises:
    a plurality of functionality groups,
    wherein each functionality group of the plurality of functionality groups specifies a membership of a respective portion of the computing devices of the plurality of computing devices.

3. The coordination point of claim 2, wherein the membership of each functionality group of the plurality of functionality groups is non-overlapping.

4. The coordination point of claim 1, wherein the role information comprises one selected from a group consisting of a system type, a solution type, a cluster name, and a node name.

5. The coordination point of claim 4, wherein the system type specifies user resource characteristics of each computing device of the plurality of computing devices.

6. The coordination point of claim 4, wherein the plurality of computing devices are part of a distributed system, wherein the system type specifies a function of the distributed system.

7. The coordination point of claim 4, wherein the cluster name specifies an identifier of a distributed system comprising the plurality of computing devices.

8. The coordination point of claim 4, wherein the node name specifies an identifier of each computing device of the plurality of computing devices.

9. The coordination point of claim 1, wherein the plurality of validators are hosted by the plurality of computing devices.

10. The coordination point of claim 1, wherein updating the distributed system map using the obtained role information comprises:
associating at least two computing devices of the plurality of computing devices with a functionality group of the distributed system map.

11. The coordination point of claim 1, wherein enforcing the configuration, associated with the functionality group, on the user resources of each computing device of the portion of the plurality of computing devices comprises:
sending a baseline configuration to validators hosted by each computing device of the portion of the plurality of computing devices.

12. The coordination point of claim 11, wherein the baseline configuration specifies a hardware configuration of the user resources of each computing device of the portion of the plurality of computing devices.

13. The coordination point of claim 11, wherein the baseline configuration specifies a firmware configuration of the user resources of each computing device of the portion of the plurality of computing devices.

14. The coordination point of claim 11, wherein the baseline configuration specifies firmware settings of the user resources of each computing device of the portion of the plurality of computing devices.

15. The coordination point of claim 11, wherein the baseline configuration specifies applications of the user resources of each computing device of the portion of the plurality of computing devices.

16. The coordination point of claim 1, wherein the processor is further programmed to:
identify a second portion of the plurality of computing devices as members of a second functionality group using the updated distributed system map; and
enforce a second configuration, associated with the second functionality group, on the user resources of each computing device of the second portion of the plurality of computing devices.

17. The coordination point of claim 16, wherein enforcing the second configuration, associated with the second functionality group, on the user resources of each computing device of the second portion of the plurality of computing devices comprises:
sending a second baseline configuration to validators hosted by each computing device of the second portion of the plurality of computing devices.

18. The coordination point of claim 17, wherein the baseline configuration and the second baseline configuration are different configurations.

19. A method for configuring user resources of a plurality of computing devices, comprising:
obtaining role information associated with a plurality of computing devices from a plurality of validators without interacting with user resources of the plurality of computing devices, wherein the plurality of validators execute using computing resources separate from the user resources;
updating the distributed system map using the obtain role information;
identifying a portion of the plurality of computing devices as members of a functionality group using the updated distributed system map; and
enforcing a configuration, associated with the functionality group, on the user resources of each computing device of the portion of the plurality of computing devices.

20. A non-transitory computer readable medium comprising computer readable program code, which when executed by a computer processor enables the computer processor to perform a method for configuring user resources of a plurality of computing devices, the method comprising:
obtaining role information associated with a plurality of computing devices from a plurality of validators without interacting with user resources of the plurality of computing devices, wherein the plurality of validators execute using computing resources separate from the user resources;
updating the distributed system map using the obtain role information;
identifying a portion of the plurality of computing devices as members of a functionality group using the updated distributed system map; and
enforcing a configuration, associated with the functionality group, on the user resources of each computing device of the portion of the plurality of computing devices.

* * * * *